US008432846B2

(12) United States Patent
Guo et al.

(10) Patent No.: US 8,432,846 B2
(45) Date of Patent: Apr. 30, 2013

(54) POINT-TO MULTIPOINT WIRELESS DISPLAY METHOD

(75) Inventors: Zihua Guo, Beijing (CN); Wei Wei, Beijing (CN)

(73) Assignee: Lenovo (Beijing) Limited, Beijing (CN)

( * ) Notice: Subject to any disclaimer, the term of this patent is extended or adjusted under 35 U.S.C. 154(b) by 994 days.

(21) Appl. No.: 12/092,929

(22) PCT Filed: Mar. 21, 2006

(86) PCT No.: PCT/CN2006/000448
§ 371 (c)(1),
(2), (4) Date: May 7, 2008

(87) PCT Pub. No.: WO2007/053987
PCT Pub. Date: May 18, 2007

(65) Prior Publication Data
US 2008/0225771 A1  Sep. 18, 2008

(30) Foreign Application Priority Data
Nov. 8, 2005  (CN) .......................... 2005 1 0115642

(51) Int. Cl.
*H04H 20/71*  (2008.01)

(52) U.S. Cl.
USPC .......................................... 370/312; 370/432

(58) Field of Classification Search .................... None
See application file for complete search history.

(56) References Cited

U.S. PATENT DOCUMENTS

| | | | |
|---|---|---|---|
| 6,151,696 A | 11/2000 | Miller et al. | |
| 6,996,104 B2 * | 2/2006 | Trossen et al. | 370/390 |
| 7,318,099 B2 * | 1/2008 | Stahl et al. | 709/229 |
| 7,490,158 B2 * | 2/2009 | Xu et al. | 709/231 |
| 7,769,398 B2 * | 8/2010 | Marston et al. | 455/463 |
| 2003/0156540 A1 | 8/2003 | Trossen et al. | |
| 2004/0098745 A1 | 5/2004 | Marston et al. | |
| 2004/0240405 A1 | 12/2004 | Okazaki | |
| 2005/0073964 A1 | 4/2005 | Schmidt et al. | |

FOREIGN PATENT DOCUMENTS

| | | |
|---|---|---|
| CN | 1578947 A | 2/2005 |
| EP | 1 515 474 A2 | 3/2005 |
| JP | 2004-363645 A | 12/2004 |

(Continued)

OTHER PUBLICATIONS

Schütt, et al.; "XTP and Multimedia ?"; Global Telecommunications Conference, 1993, Including a Communications Theory Mini-Conference, Technical Program Conference Record, IEEE in Houston, Texas, USA Nov. 29-Dec. 2, 1993, pp. 877-882.

*Primary Examiner* — Jianye Wu
(74) *Attorney, Agent, or Firm* — Dickstein Shapiro LLP

(57) ABSTRACT

The present invention discloses a point-to-multipoint wireless display method comprising steps of establishing connection between a data processing device and multiple display devices, acquiring pixel data, generating pixel data packets and transmitting the pixel data packets over the air in a multicast manner at the data processing device side, receiving the multicast data packets over the air, unpacketizing the data packets in accordance with a multicast protocol and restoring the pixel data from the multicast data packets at the display device side, and performing display output according to the pixel data. Preferably, the transmitting rate at the data processing device side can be determined according to signal strength, and the display devices can be divided into several multicast groups.

11 Claims, 3 Drawing Sheets

FOREIGN PATENT DOCUMENTS

| | | |
|---|---|---|
| JP | 2005-286405 A | 10/2005 |
| WO | WO-03/071691 A1 | 8/2003 |
| WO | WO-2004/044710 A2 | 5/2004 |
| WO | WO-2004/047373 | 6/2004 |
| WO | WO-2004/082291 A1 | 9/2004 |
| WO | WO-2005/083558 A1 | 9/2005 |

* cited by examiner

POINT-TO MULTIPOINT WIRELESS DISPLAY METHOD

CROSS-REFERENCE TO RELATED APPLICATIONS

This is a national stage application under 35 U.S.C. §371 of International application No. PCT/CN2006/000448, filed Mar. 21, 2006 claiming priority to Chinese application No. 200510115642.7, filed Nov. 8, 2005.

BACKGROUND OF THE INVENTION

1. Field of Invention

The present invention relates to wireless data transmission and data processing technologies, in particular, to a point-to-multipoint wireless display method.

2. Description of Prior Art

With the development of electronic technology and material industry, there are a growing number of interactions between human and various electronic data processing systems. Inevitably, people will face with all kinds of display facilities and display devices in a more frequent and pervasive manner. For example, when a user operates his or her personal computer (PC), a display device is required to output information, in addition to the mainframe of the PC for executing computation and other functions. A typical application scenario comprises a PC mainframe and display, a portable computer connected with a projector or a large-screen TV, etc.

So, display devices have gradually become an indispensable part of our daily life. The display devices are mainly classified into three types. The first type is Cathode Ray Tube display (referred to as CRT display), which is the principal display portion of a desktop computer. The second type is flat panel display including mainly liquid crystal display (referred to as LCD display) and plasma display. Such display is widely used in many fields including computer, household application, etc. The third type is large-screen display device including DLP (Digital Light Processing) projection large screen and TV wall, which is the preferred display device used in public places.

Currently, signals for display devices are generally transmitted via a cable. Connecting a display device via a cable results in many disadvantages. For example, CRT display has to be connected with the mainframe of a desktop computer by a cable in using the computer, and thus the distance and mobility are limited by the cable. In other words, the common cable connection between a display device and a computer mainframe has restricted the application scenarios.

To get rid of the limitation of cable and utilize facilities, such as computer, in a more convenient way, wireless techniques can be used to replace the cable, that is, signals are transmitted to display devices by way of wireless transmission.

In the prior art, a display device is generally a dedicated device for a corresponding device. It is difficult to project the screen of a computer to more than one display in a wired form. So far, there has been no wireless solution, either.

If the conventional TCP/IP protocol is adopted, complexity will be rather high, and there will be increase in processing load and manufacture cost of the device.

Further, the presence of multiple wireless display devices may give rise to large difference and uncertainty in wireless channels between these display devices, which will affect robustness (indicating error tolerant capability) and reliability of the system.

Therefore, it is necessary to provide a new point-to-multipoint wireless display method so as to realize wireless connection between a computer and multiple display devices.

SUMMARY OF THE INVENTION

In view of the disadvantages in the prior art, a object of the present invention is to provide a point-to-multipoint wireless display method capable of realizing wireless multicast transmission of display signals.

In order to achieve the object of the present invention, there is provided a point-to-multipoint wireless display method comprising the steps of a) establishing connection between a data processing device and multiple display devices, b) acquiring pixel data, generating pixel data packets and transmitting the pixel data packets over the air in a multicast manner at the data processing device side, c) receiving the multicast data packets over the air, unpacketizing the data packets in accordance with a multicast protocol and restoring the pixel data from the multicast data packets at the display device side, and d) performing display output according to the pixel data.

Preferably, said step b) comprises the steps of packetizing at an upper layer the pixel data in accordance with a predetermined application layer protocol, transferring the pixel data packets to a transport layer, transmitting the pixel data packets to a link layer in multicast and then transmitting the pixel data packets via a physical layer over the air.

Said step c) comprises the steps of delivering the multicast data packets to the upper layer after unpacketizion at the physical layer and the link layer, and unpacketizing the multicast data packets and restoring the pixel data in accordance with the application layer protocol at a network layer.

Preferably, one multicast protocol is used as combined protocol for said transport layer and said network layer.

Preferably, in said step b), the pixel data is acquired from the operating system of the data processing device or from the output side of a video card in the data processing device.

Preferably, the method further comprises the steps of transmitting, by the data processing device, probe packets to the display devices at a basic rate;
gathering the channel conditions of the respective display devices; and
determining an appropriate transmitting rate at the data processing side based on said channel conditions.

Preferably, said step of determining an appropriate transmitting rate at the data processing side based on said channel conditions further comprise selecting a strength value based on the signal strengths of the multiple display devices so that the signals strengths of a predetermined proportion of the display devices are above the strength value, and then determining a corresponding transmitting rate based on the correspondence between the signal strengths and rates.

Preferably, if the signal strength of the strength value corresponds to more than one rate value, the lowest rate is selected as the transmitting rate.

Preferably, the method further comprises the step pf deciding whether the transmitting rate is able to support the transmission with a system default image quality or higher image quality, transmitting the data with the system default image quality or higher image quality if the answer is yes, while notifying a user to reduce resolution or it is possible to receive a poor image quality if the answer is no.

Preferably, if the selected transmitting rate is too low to satisfy the lowest requirement on image quality, the multiple display devices are divided into at least two multicast groups according to the signal strengths.

Preferably, in the case of two multicast groups, the method further comprises the steps of e1) selecting transmitting rates α and β for the two multicast groups, respectively, e2) transmitting at the data processing device side each data frame to the two groups at the rate α, where the lower-rate group of display devices receives the data with best effort, e3) deciding whether the data processing device side transmits the data frame to the lower-rate group at the rate β, and e4) transmitting the data frame to the lower-rate group at the rate β if the answer is yes, otherwise returning to step e2) if the answer is no.

Preferably, deciding in said step e3) comprises the step of transmitting one frame for the group with the rate β at the interval of N frames, where N is determined with the following formula $$N=\text{Round}[F,(1-F*B/\alpha)*\beta/B]$$

wherein F represents the number of frames per second in the group with the rate α, B denotes the size of each frame, the operation Round(m,n) denotes dividing m by n and rounding the quotient.

The present invention offers advantages over the conventional solutions. In the present invention, wireless transmission between the data processing device and the multiple display devices is implemented on the basis of the multicast protocol, instead of the conventional TCP/IP protocol. This can reduce complexity and effective lower the processing load and manufacture cost of the device. With the present invention, display content can be conveniently and concurrently projected onto multiple display devices in a wireless manner. Because of UWB technique, the screen quality improved, and thus distortion is alleviated.

Further, the preferred solution of the present invention provides a method for transmitting rate control to address the case where the presence of multiple wireless display devices give rises to large difference and uncertainty in wireless channels between these display devices. Therefore, robustness and reliability of the system can be enhanced.

DETAILED DESCRIPTION OF PREFERRED EMBODIMENTS

Figure 1:
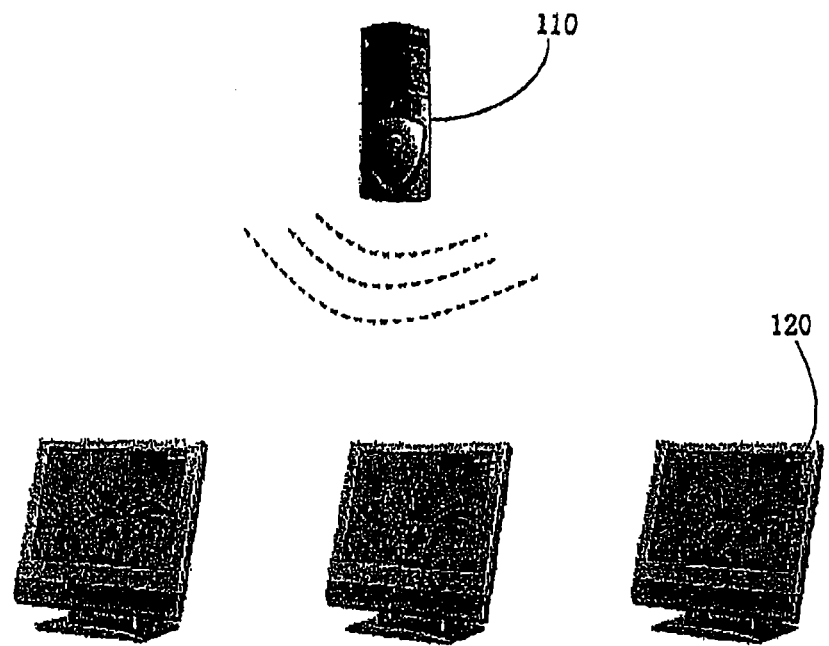
FIG. 1 is a schematic diagram showing an application environment for the point-to-multipoint wireless display method of the present invention.

FIG. 1 is a schematic diagram showing an application environment for the point-to-multipoint wireless display method of the present invention.

In FIG. 1, data processing device 110 and a plurality of display devices 120 constitutes a computer wireless display system in the form of one to multiple.

The data processing device 110 may be a variety of electronic devices having the capability of processing display data, for example, PC/server, portable computer, handheld device (PDA, DV) and the like. Meanwhile, the data processing device 110 may have accessorial devices such as keyboard, mouse and joy stick.

The display device 120 can be any one of various devices capable of implementing video signal reception and image display. For example, it can be a computer monitor (LCD, CRT, etc.), projector, TV or the like.

For point-to-multipoint wireless display, the data processing device 110 needs to perform at least the operations of acquiring pixel data, conducting simple compression or no compression on the pixel data and then packetizing the pixel data with certain application layer protocol, transferring the pixel data packets to a transport layer, transmitting them to a UWB link layer in a multicast manner and transmitting them from a physical layer over the air.

On the other hand, the display device 120 needs to perform at least the operations of receiving at the UWB side the multicast data over the air, and then delivering the data to an upper layer after unpacketizing the data at the physical layer and link layer.

At a network layer, the multicast data packets are unpacketized and the pixel data are restored according to the application layer protocol.

Figure 2:
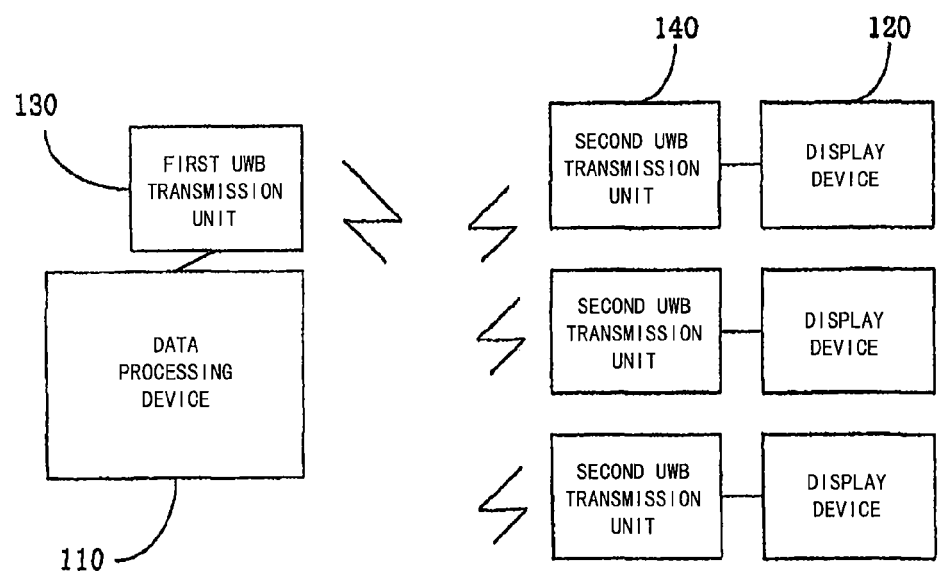
FIG. 2 is a block diagram showing the display system as shown in FIG. 1.

FIG. 2 is a block diagram showing the display system as shown in FIG. 1.

First UWB transmission unit 130 is provided at the data processing device 110 side. The first UWB transmission unit 130 performs at least the operations of obtaining the pixel data through the operation system or a video card (not shown) at the data processing device 110 side, conducting simple compression or no compression on the pixel data and then packetizing the pixel data with certain application layer protocol, transferring the pixel data packets to a transport layer, transmitting them to a UWB link layer in a multicast manner and transmitting them from a physical layer over the air.

There are two types of implementation for the first UWB transmission unit 130.

In one of the types, the first UWB transmission unit 130 is in the form of a data card (inserted externally or embedded) of the data processing device 110, such as a PCI/mini-PCI/USB card. The data card can obtain screen data through the operating system of the data processing device 110 and is under the control from software in the operating system of the data processing device 110.

In the other type, the first UWB transmission unit 130 obtains screen data directly from the output of a video card other than through the operating system. The first UWB transmission unit 130 takes the form of an externally-inserted module connected to the output interface of the video card or graphic controller of the data processing device. Alternatively, the first UWB transmission unit 130 can be integrated with the video card.

Second UWB transmission unit 140 is provided at the display device 120 side. The second UWB transmission unit 140 performs at least the operations of receiving the multicast data over the air, then delivering the data to an upper layer after unpacketizing the data at the physical layer and link layer, unpacketizing the multicast data packets and restoring the pixel data according to the application layer protocol at the network layer, and delivering the pixel data to the display device 120 for display output.

There are two types of implementation for the second UWB transmission unit 140.

In one of the types, the second UWB transmission unit 140 can take the form of being externally inserted into the display device 120. For example, it can be inserted into VGA/DVI interface.

In the other type, the second UWB transmission unit 140 can be integrated with the display device 120.

Figure 3:
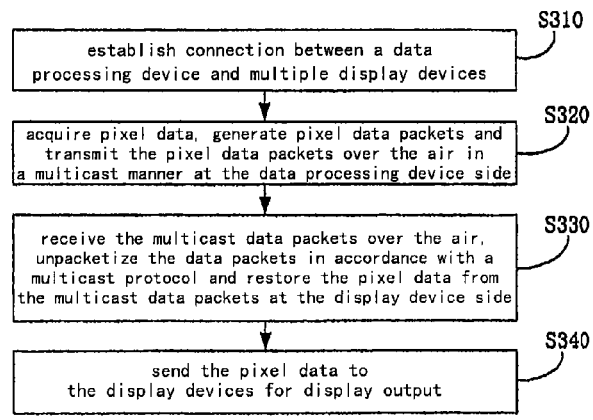
FIG. 3 is a flowchart showing the point-to-multipoint wireless display method of the present invention.

FIG. 3 is a flowchart showing the point-to-multipoint wireless display method of the present invention.

Referring to FIG. 3, connection between the data processing device and multiple display devices is established at step S310.

The connection establishment between the data processing device and multiple display devices is performed by a UWB chip underlying layer. Thereafter, communication of packet transmission can be initiated.

At step S320, the data processing device acquires pixel data from the operating system or the output side of the video card, generates pixel data packets and transmits the pixel data packets over the air in a multicast manner.

Here, at the upper layer, the pixel data are packetized according to certain application layer protocol, transferred to the transport layer, transmitted to the UWB link layer in a multicast manner and further transmitted from the physical layer over the air.

The pixel data can be simply compressed or not compressed at all.

Unlike the conventional TCP/IP protocol, one multicast protocol is used as combined protocol for the transport layer and the network layer in the present invention. Each packet of the multicast protocol contains information such as multicast address flag, transmitting side flag, data type flag, image data body and check bit.

Table 1 shows an example of the format of data packet in the present invention.

TABLE 1

| Multicast address | Transmitting side address | Data type | Pixel data body | Check |
|---|---|---|---|---|

The multicast address indicates whether the data packet is singlecast or multicast, and which multicast group (there may be more than one multicast group, as described later) is the destination of the data packet if it is multicast. The transmitting side address indicates who transmits the data. The data type denotes the data packet is a control message, a data message or the like. If the data type denotes a data message, the pixel data body is provided containing information such as the begging and ending addresses and length of a pixel block as well as RGB value for each of the final pixels. The check bit can be the conventional CRC checking code.

At step S330, the display device receives the multicast data over the air and then unpacketizes them according to the multicast protocol. Subsequently, the pixel data is restored from the multicast data packets.

Here, the multicast data packets are delivered to an upper layer after unpacketized at the physical layer and link layer. At the network layer, the multicast data packets are unpacketized and the pixel data are restored according to the application layer protocol.

At step S340, the pixel data are sent to the display device for display output.

The method of the present invention takes into account the difference among respective channels in the presence of multiple wireless display devices. To guarantee normal operation for most of the display devices, the present invention designs a device channel detection signaling so as to select an appropriate channel rate.

Figure 4:
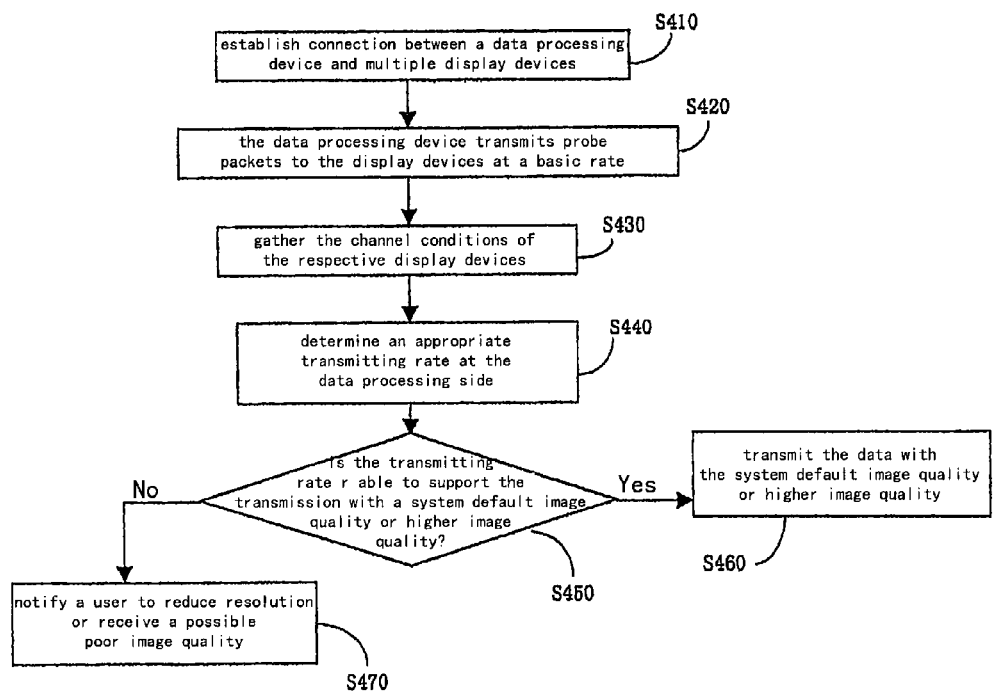
FIG. 4 is flowchart showing channel rate selection in the method of the present invention.

FIG. 4 is flowchart of channel rate selection in the method of the present invention.

Referring to FIG. 4, connection between the data processing device and multiple display devices is established at step S410.

At step S420, the data processing device transmits probe packets to the display devices at a basic rate.

Here, there can be various formats for the probe packet. For example, the probe packet can be a simple null packet with only a flag at the packet head. An example of the format at the network layer is shown in Table 2.

TABLE 2

| Receiving side address | Transmitting side address | Data type | Check |
|---|---|---|---|

The flag of data type defines that the packet is a probe message.

Step S430 is gathering channel conditions for the respective display devices.

Then, an appropriate transmitting rate at the data processing device side is determined on the basis of the channel conditions.

Figure 5:
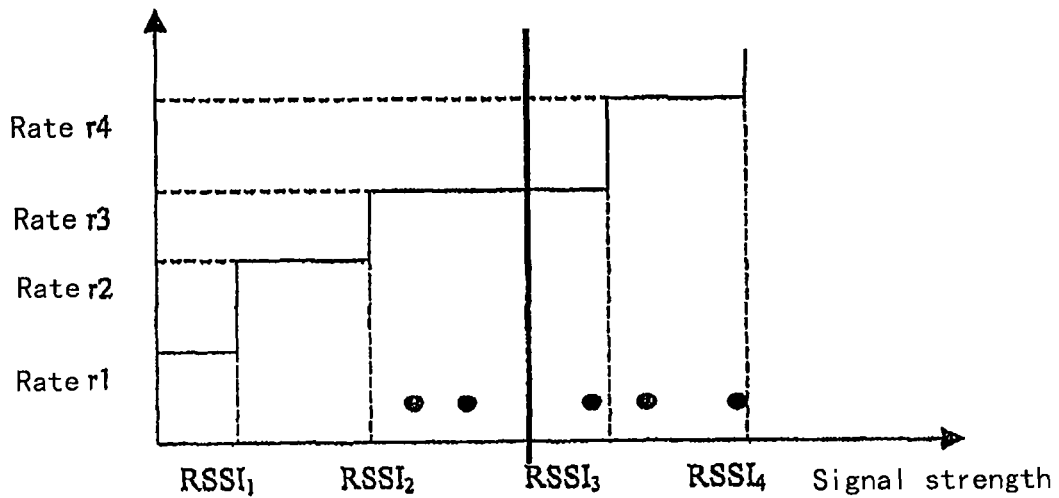
FIG. 5 is a schematic diagram showing transmitting rate determination in the method shown in FIG. 4.

FIG. 5 shows a specific example of determining the transmitting rate r. In the case that the received signal strengths of 5 display devices are different, as shown in FIG. 5, a strength value is found so that the signal strengths of 50% of these display devices are above the value. Subsequently, a transmitting rate is found in a rate correspondence table according to the signal strengths of the value. If the scope of the signal strengths covers more than one rate values, the lowest rate is selected as the transmitting rate.

At step S450, it is decided whether the transmitting rate is able to support the transmission with a system default image quality or higher image quality. If the answer is yes, the flow proceeds to step S460, otherwise the flow turns to step S470.

At step S460, the data is transmitted with the system default image quality or higher image quality.

At step S470, a user is notified to reduce resolution or receive a possible poor image quality.

When the multicast rate r selected through the above method is too low to satisfy the lowest requirement on image quality, the present invention further provide a grouping method.

Now, the multiple display devices are not regarded as one multicast group but can be divided into two multicast groups according to K-M algorithm (obviously, they can be divided into more than two groups according to any similar algorithm). A different transmitting rate is adopted for each of the multicast groups from any other groups.

Figure 6:
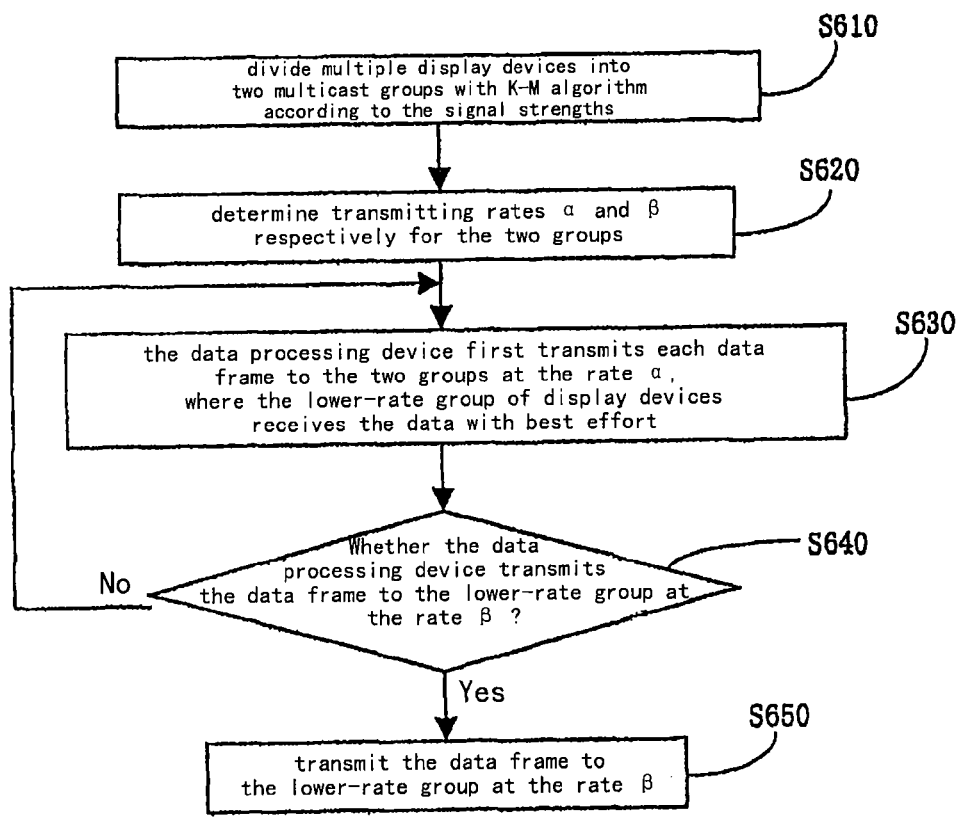
FIG. 6 is a flowchart showing transmission after group division in the method of the present invention.

FIG. 6 is a flowchart of transmission after group division in the method of the present invention.

Referring to FIG. 6, the multiple display devices are divided into two multicast groups with K-M algorithm according to the signal strengths at step S610.

Transmitting rates α and β are selected respectively for the two multicast groups at step S620.

At step S630, the data processing device first transmits each data frame to the two groups at the rate α, where the lower-rate group of display devices receives the data with best effort.

At step S640, it is determined as to whether the data processing device transmits the data frame to the lower-rate group at the rate P. The flow proceeds to step S650 if the answer is yes, while returning to step S630 if the answer is no.

It is impossible to transmit all the data frames to the two groups at the rates α and β, respectively, due to the limited overall capacity of the system. So, some of the frames can be extracted and transmitted for β multicast. For example, one frame for the group with the rate β can be transmitted at the interval of N frames, where N is determined with the formula $$N=\text{Round}[F,(1-F*B/\alpha)*\beta/B]$$

F represents the number of frames per second in the group with the rate α, B is the size of each frame, the operation Round(m,n) denotes dividing m by n and rounding the quotient.

The data frame is transmitted to the lower-rate group at the rate β at step S650.

The advantage of the present invention is that requirement of part of the display devices can still be satisfied even when the system capacity is insufficient, that is, the devices with a higher rate can still perform normal display. At the same time, the lower-rate devices keep receiving the data with best effort and thus can decode image data partially, though full and accurate decoding can be guaranteed at the rate α. In this way, image data can be decoded more efficiently in combination of the lower-rate devices, β multicast, and a partial diversity function can be achieved.

The foregoing description illustrates merely the preferred embodiments of the present invention and has no intention of limiting the scope of the present invention. For those skilled in the art, various modifications and variations can be made to the present invention. Any change, substitution or improvement within the spirit and principle of the present invention should fall into the scope of the present invention.

What is claimed is:

1. A point-to-multipoint wireless display method, comprising steps of
   a) establishing connection between a data processing device and multiple display devices,
   b) acquiring pixel data, packetizing the pixel data into pixel data packets in accordance with a predetermined application layer protocol to generate pixel data packets, transferring the pixel data packets to a combined transport and network layer, transmitting the pixel data packets to an Ultra Wide Band (UWB) link layer and then transmitting the pixel data packets via a physical layer over the air at the data processing device side,
   c) receiving multicast data packets over the air, delivering the multicast data packets to the combined transport and network layer after unpacketizion at the physical layer and the UWB link layer, and unpacketizing the multicast data packets and restoring the pixel data in accordance with the application layer protocol at the combined transport and network layer at the display device side, and
   d) performing display output according to the pixel data, wherein the combined transport and network layer is a combination of a transport layer and a network layer that use one multicast protocol as a combined protocol, each packet of the multicast protocol contains a multicast address flag, a transmitting side flag, a data type flag, an image data body and a check bit.

2. The point-to-multipoint wireless display method according to claim 1, wherein in said step b), the pixel data is acquired from the operating system of the data processing device or from the output side of a video card in the data processing device.

3. The point-to-multipoint wireless display method according to claim 1, further comprising steps of transmitting, by the data processing device, probe packets to the display devices at a basic rate; gathering the channel conditions of the respective display devices; and determining an appropriate transmitting rate at the data processing device side based on said channel conditions.

4. The point-to-multipoint wireless display method according to claim 3, wherein said step of determining an appropriate transmitting rate at the data processing device side in accordance with said channel conditions further comprise selecting a strength value based on the signal strengths of the multiple display devices so that the signals strengths of a predetermined proportion of the display devices are above the strength value, and then determining a corresponding transmitting rate based on the correspondence between the signal strengths and rates.

5. The point-to-multipoint wireless display method according to claim 4, wherein, if the signal strength of the strength value corresponds to more than one rate values, the lowest of the rate values is selected as the transmitting rate.

6. The point-to-multipoint wireless display method according to claim 3, further comprising steps of deciding whether the transmitting rate is able to support the transmission with a system default image quality or higher image quality, transmitting the data with the system default image quality or higher image quality if the answer is yes, while notifying a user to reduce resolution or receive a possible poor image quality if the answer is no.

7. The point-to-multipoint wireless display method according to claim 3, wherein, if the determined transmitting rate is too low to satisfy a lowest requirement on image quality, the multiple display devices are divided into at least two multicast groups according to the signal strengths of the multiple display devices.

8. The point-to-multipoint wireless display method according to claim 7, wherein in the case of two multicast groups, the method further comprises steps of
   e1) selecting transmitting rates α and β respectively for the two multicast groups,
   e2) transmitting at the data processing device side each pixel data packet to the two groups at the rate α, where a lower-rate group of display devices of the two groups receives the pixel data packet with best effort,
   e3) deciding whether the data processing device side transmits the pixel data packet to the lower-rate group at the rate β, and
   e4) transmitting the pixel data packet to the lower-rate group at the rate β if the answer is yes, otherwise returning to step e2) if the answer is no.

9. The point-to-multipoint wireless display method according to claim 8, wherein deciding in said step e3) comprises transmitting one pixel data packet for the group with the rate β at the interval of N pixel data packets, where N is determined with a formula $$N=\text{Round}[F,(1-F*B/\alpha)*\beta/B]$$

F represents the number of pixel data packets per second in the group with the rate α, B is the size of each pixel data packet, the operation Round(m,n) denotes rounding a quotient obtained by dividing m by n.

10. The point-to-multipoint wireless display method according to claim 1, further comprising steps of transmitting, by the data processing device, probe packets to the display devices at a basic rate; gathering the channel conditions of the respective display devices; and determining an appropriate transmitting rate at the data processing device side based on said channel conditions.

11. The point-to-multipoint wireless display method according to claim 2, further comprising steps of transmitting, by the data processing device, probe packets to the display devices at a basic rate; gathering the channel conditions of the respective display devices; and determining an appropriate transmitting rate at the data processing device side based on said channel conditions.

\* \* \* \* \*